United States Patent
Cerk et al.

(10) Patent No.: US 11,248,075 B2
(45) Date of Patent: **\*Feb. 15, 2022**

(54) ETHYLENE/ALPHA-OLEFIN INTERPOLYMERS WITH IMPROVED PELLET FLOWABILITY

(71) Applicant: Dow Global Technologies LLC, Midland, MI (US)

(72) Inventors: Frank J. Cerk, Katy, TX (US); Rongjuan Cong, Lake Jackson, TX (US); Shrikant Dhodapkar, Lake Jackson, TX (US); Selim Yalvac, Pearland, TX (US); Morgan M. Hughes, Angleton, TX (US); Timothy W. Gambrel, Lake Jackson, TX (US); Yi Jin, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,973

(22) Filed: Oct. 16, 2019

(65) Prior Publication Data

US 2020/0048385 A1  Feb. 13, 2020

Related U.S. Application Data

(60) Continuation of application No. 16/405,811, filed on May 7, 2019, now Pat. No. 10,450,393, which is a continuation of application No. 15/722,107, filed on Oct. 2, 2017, now abandoned, which is a continuation of application No. 15/616,560, filed on Jun. 7, 2017, now Pat. No. 9,902,791, which is a division of application No. 14/889,271, filed as application No. PCT/US2014/045964 on Jul. 9, 2014, now Pat. No. 9,688,795.

(60) Provisional application No. 61/844,044, filed on Jul. 9, 2013.

(51) Int. Cl.
  *C08F 210/02* (2006.01)
  *C08F 210/16* (2006.01)
  *C08F 4/659* (2006.01)
  *C08F 2/04* (2006.01)

(52) U.S. Cl.
  CPC ........ *C08F 210/16* (2013.01); *C08F 4/65908* (2013.01); *C08F 4/65912* (2013.01); *C08F 2/04* (2013.01); *Y02P 20/582* (2015.11)

(58) Field of Classification Search
  CPC ................................................... C08F 210/16
  See application file for complete search history.

(56) References Cited

U.S. PATENT DOCUMENTS

| | | | |
|---|---|---|---|
| 3,692,763 A | 9/1972 | Van Saane et al. | |
| 3,891,610 A | 6/1975 | Fowells | |
| 4,412,025 A | 10/1983 | Corwin et al. | |
| 5,272,236 A | 12/1993 | Lai et al. | |
| 5,278,272 A | 1/1994 | Lai et al. | |
| 5,612,271 A | 3/1997 | Zandona | |
| 5,763,349 A | 6/1998 | Zandona | |
| 5,817,725 A | 10/1998 | Zandona | |
| 6,506,867 B1 | 1/2003 | Lai et al. | |
| 6,642,405 B1 | 11/2003 | Mori et al. | |
| 7,964,699 B2 | 6/2011 | Marissal et al. | |
| 8,932,527 B1 | 1/2015 | Kufeld et al. | |
| 9,362,436 B2 | 6/2016 | Nanjundiah et al. | |
| 9,688,795 B2 * | 6/2017 | Cerk ................... | C08F 4/65912 |
| 9,708,428 B2 | 7/2017 | Reimers et al. | |
| 9,902,791 B2 * | 2/2018 | Cerk ................... | C08F 4/65912 |
| 10,450,393 B2 * | 10/2019 | Cerk ..................... | C08F 210/16 |
| 2005/0187418 A1 | 8/2005 | Small et al. | |
| 2008/0182949 A1 | 7/2008 | Hama | |
| 2009/0005520 A1 | 1/2009 | Kiss et al. | |
| 2010/0292418 A1 | 11/2010 | Jorgensen et al. | |
| 2010/0324242 A1 | 12/2010 | Machida et al. | |
| 2013/0085246 A1 | 4/2013 | Kum et al. | |
| 2013/0137828 A1 | 5/2013 | Michie, Jr. et al. | |
| 2013/0167911 A1 | 7/2013 | Ikenaga et al. | |
| 2014/0080970 A1 | 3/2014 | Desjardins et al. | |
| 2014/0142360 A1 | 5/2014 | Brown et al. | |
| 2017/0267797 A1 | 9/2017 | Cerk et al. | |

FOREIGN PATENT DOCUMENTS

| | | |
|---|---|---|
| EP | 1148115 A1 | 10/2001 |
| EP | 1241191 A1 | 9/2002 |
| EP | 1914248 A1 | 4/2008 |
| JP | H07-102133 | 4/1995 |
| JP | 2000515190 A | 11/2000 |
| JP | 2000336106 A | 12/2000 |
| JP | 2008524431 A | 7/2008 |
| WO | 1990006326 A1 | 6/1990 |
| WO | 1998003603 A1 | 1/1998 |
| WO | 2006/069205 A1 | 6/2006 |
| WO | 2008047860 A1 | 4/2008 |
| WO | 2009082465 A1 | 7/2009 |
| WO | 2013062758 A1 | 5/2013 |

OTHER PUBLICATIONS

PCT/ US2014/045964 International Search Report dated Sep. 2, 2014.
PCT/ US2014/045964, International Preliminary Report on Patentability dated Jan. 12, 2016.
"Cited Reference 3" of the concurrently submitted English-language translation of the office action dated Apr. 3, 2018 in corresponding JP Patent Application No. 2016-525452 (Ito Yukio, Plastic Technology Complete Book 5, Polyethylene Resin (High Pressure Method), Industrial Research Co., Ltd., Apr. 20, 1971, pp. 13-15).
JP Application No. 2016-525452 English version of office action dated Apr. 3, 2018.

\* cited by examiner

*Primary Examiner* — Rip A Lee
(74) *Attorney, Agent, or Firm* — Cheney Huang

(57) ABSTRACT

The invention provides compositions, each comprising an ethylene/alpha-olefin interpolymer, which has a reduced level of a low density, low molecular weight oligomeric fraction, as indicated by an HCC value, as described herein, and reduced levels of inorganic content or lower Tm. The invention also provides processes for forming such interpolymers.

13 Claims, 4 Drawing Sheets

ETHYLENE/ALPHA-OLEFIN INTERPOLYMERS WITH IMPROVED PELLET FLOWABILITY

The present application is a continuation of U.S. application Ser. No. 16/405,811, filed on May 7, 2019, now U.S. patent Ser. No. 10/450,393, which is a continuation of U.S. application Ser. No. 15/722,107, filed on Oct. 2, 2017, now abandoned, which is a continuation of U.S. application Ser. No. 15/616,560, filed on Jun. 7, 2017, now U.S. Pat. No. 9,902,791, which is a divisional of U.S. application Ser. No. 14/889,271, filed on Nov. 5, 2015, now U.S. Pat. No. 9,688,795, which is a 35 U.S.C. § 371 of International Application No. PCT/US2014/045964, filed on Jul. 9, 2014, which claims the benefit of U.S. Provisional Application No. 61/844,044, filed on Jul. 9, 2013.

BACKGROUND

Low molecular weight ethylene/alpha-olefin copolymers often exhibit stickiness during the flow of pellets formed from such copolymers. A new component or species of the copolymer was discovered, and found to be responsible for sticky pellet formation, which resulted in pellets massing and poor materials handling. This species is a low-density, low molecular weight, oligomeric fraction (indicated by a "High Comonomer Content" or "HCC" value). Thus, there is a need for new polymers and processes to form the same, which have reduced amounts of such oligomeric fractions. There is a further need for such polymers with lower metal residues and lower melting temperatures. These needs have been met by the following invention.

SUMMARY OF THE INVENTION

The invention provides a composition comprising an ethylene/alpha-olefin interpolymer, and wherein the ethylene/alpha-olefin interpolymer comprises the following properties:
  a) an HCC value less than, or equal to, 6.0%; and
  b) an inorganic content of "Al, Na and Mg" less than, or equal to, 40.0 ppm, and a Ca content less than 7.0 ppm, each based on the weight of the interpolymer.

The invention also provides a composition comprising an ethylene/alpha-olefin interpolymer, and wherein the ethylene/alpha-olefin interpolymer comprises the following properties:
  a) an HCC value less than, or equal to, 6.0%; and
  b) an inorganic content of "Al, Ca, Cl, Mg, Na, S, P, Ti, and Zn" less than, or equal to, 65.0 ppm, based on the weight of the interpolymer.

The invention also provides a composition comprising an ethylene/alpha-olefin interpolymer, and wherein the ethylene/alpha-olefin interpolymer comprises the following properties:
  a) an HCC value less than, or equal to, 6.0%; and
  b) an inorganic content of "Al, Ca, Cl, Mg, Na, S, P, Ti, Zn, Zr, and Hf," less than, or equal to, 65.0 ppm, based on the weight of the interpolymer.

The invention also provides a composition comprising an ethylene/alpha-olefin interpolymer, and wherein the ethylene/alpha-olefin interpolymer comprises the following properties:
  a) an HCC value less than, or equal to, 4.4%; and
  b) a highest peak melting temperature less than, or equal to, 72.0° C.

The invention also provides a process to polymerize an ethylene/alpha-olefin interpolymer, said process comprising polymerizing ethylene, in solution, in at least one reactor, in the presence of at least one catalyst, and wherein the reactor ethylene concentration is greater than, or equal to 14.0 kg/m$^3$, and wherein the Reynolds Number of the reactor is greater than, or equal to 2000, and wherein the efficiency of the catalyst is greater than, or equal to, 2,500,000 lb polymer per lb catalyst metal.

DETAILED DESCRIPTION

Figure 1:
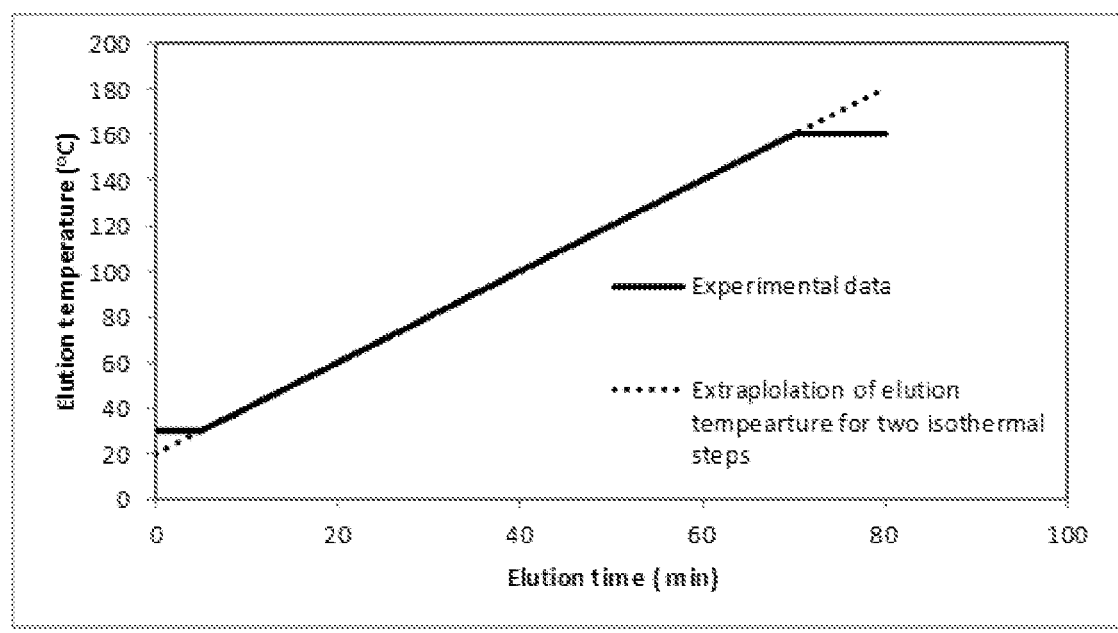
FIG. 1 depicts the extrapolation of the elution temperature for a TGIC temperature calibration.

As discussed above, the invention provides a composition comprising an ethylene/alpha-olefin interpolymer, and wherein the ethylene/alpha-olefin interpolymer comprises the following properties:
  a) an HCC value less than, or equal to, 6.0%; and
  b) an inorganic content of "Al, Na and Mg" less than, or equal to, 40.0 ppm, further less than, or equal to, 38.0 ppm, further less than, or equal to, 35.0 ppm, and a Ca content less than 7.0 ppm, each based on the weight of the interpolymer.

The invention also provides a composition comprising an ethylene/alpha-olefin interpolymer, and wherein the ethylene/alpha-olefin interpolymer comprises the following properties:
  a) an HCC value less than, or equal to, 6.0%; and
  b) an inorganic content of "Al, Ca, Cl, Mg, Na, S, P, Ti, and Zn" less than, or equal to, 65.0 ppm, further less than, or equal to, 60.0 ppm, based on the weight of the interpolymer.

The invention also provides a composition comprising an ethylene/alpha-olefin interpolymer, and wherein the ethylene/alpha-olefin interpolymer comprises the following properties:
  a) an HCC value less than, or equal to, 6.0%; and
  b) an inorganic content of "Al, Ca, Cl, Mg, Na, S, P, Ti, Zn, Zr, and Hf," less than, or equal to, 65.0 ppm, further less than, or equal to, 60.0 ppm, based on the weight of the interpolymer.

The invention also provides a composition comprising an ethylene/alpha-olefin interpolymer, and wherein the ethylene/alpha-olefin interpolymer comprises the following properties:
  a) an HCC value less than, or equal to, 4.4%, further less than, or equal to, 4.2%
  b) a highest peak melting temperature less than, or equal to, 72.0° C., further less than, or equal to, 71.0° C., further less than, or equal to, 70.0° C.

The invention also provides a process to polymerize an ethylene/alpha-olefin interpolymer, said process comprising polymerizing ethylene, in solution, in at least one reactor, in the presence of at least one catalyst, and wherein the reactor ethylene concentration is greater than, or equal to 14.0 kg/m³, and wherein the Reynolds Number of the reactor is greater than, or equal to 2000, further greater than, or equal to, 3000, further greater than, or equal to, 4000, further greater than, or equal to, 5000, and wherein the efficiency of the catalyst is greater than, or equal to, 2,500,000 lb polymer per lb catalyst metal, further greater than, or equal to, 2,800,000 lb polymer per lb catalyst metal, further greater than, or equal to, 3,000,000 lb polymer per lb catalyst metal.

Reynolds Number (dimensionless)=(density×velocity×diameter)/viscosity, or, in an alternate form, Reynolds Number (dimensionless)=6.31×flowrate/reactor pipe diameter/viscosity; wherein 6.31 is a constant factor; flowrate=reactor loop recirculation flowrate in lb/hr; reactor pipe diameter=reactor loop piping inside diameter in inches; and viscosity=reactor solution viscosity in centipoise (cP).

For example, if the loop flowrate=750,000 lb/h; the reactor pipe diameter=16 inches; and the viscosity=1000 cP, then Reynolds Number is 295.

An inventive process may comprise a combination of two or more embodiments described herein.

An inventive composition may comprise a combination of two or more embodiments described herein.

The embodiments directed to the ethylene/alpha-olefin interpolymer, as described herein, apply to the inventive compositions and the inventive processes, each as described above.

In one embodiment, the ethylene/alpha-olefin interpolymer has an HCC value less than, or equal to, 5.5%, further less than, or equal to, 5.0%, further less than, or equal to, 4.5%, further less than, or equal to, 4.0%.

In one embodiment, the ethylene/alpha-olefin interpolymer has a highest peak melting temperature less than, or equal to, 72.0° C., further less than, or equal to, 71.5° C., further less than, or equal to, 71.0° C.

In one embodiment, the ethylene/alpha-olefin interpolymer has an inorganic content of Cr, Mo, Ni and Pd, less than, or equal to, 10.0 ppm, further less than, or equal to, 7.0 ppm, further less than, or equal to, 5.0 ppm, based on the weight of the interpolymer.

In one embodiment, the ethylene/alpha-olefin interpolymer has a Yellowness Index (YI) less than or equal to, 2.00, further less than or equal to, 1.50, further less than, or equal to, 1.20.

In one embodiment, the ethylene/alpha-olefin interpolymer has a pellet flowability greater than, or equal to, 125.0 g/sec, further greater than, or equal to, 130.0 g/sec, further greater than, or equal to, 140.0 g/sec, further greater than, or equal to, 150.0 g/sec. The pellet flowability is determined by the method described herein.

In one embodiment, the ethylene/alpha-olefin interpolymer has a pellet flowability greater than, or equal to, 155.0 g/sec, further greater than, or equal to, 160.0 g/sec, further greater than, or equal to, 165.0 g/sec, further greater than, or equal to, 170.0 g/sec. The pellet flowability is determined by the method described herein.

In one embodiment, the ethylene/alpha-olefin interpolymer has a pellet flowability from 125.0 g/sec to 200.0 g/sec. The pellet flowability is determined by the method described herein.

In regard to the ethylene/alpha-olefin interpolymer, preferred α-olefins include, but are not limited to, C3-C20 α-olefins, and further C3-C10 α-olefins. More preferred α-olefins include propylene, 1-butene, 1-pentene, 1-hexene, 1-heptene and 1-octene, and more further include propylene, 1-butene, 1-hexene and 1-octene.

In one embodiment, the ethylene/α-olefin interpolymer, is an ethylene/α-olefin copolymer. Preferred α-olefins are described above.

In one embodiment, the ethylene/alpha-olefin interpolymer has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the ethylene/alpha-olefin interpolymer is an ethylene/α-olefin copolymer. Preferred α-olefins are described above.

In one embodiment, ethylene/alpha-olefin interpolymer has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the ethylene/alpha-olefin interpolymer is an ethylene/α-olefin copolymer. Preferred α-olefins are described above.

In one embodiment, the ethylene/alpha-olefin interpolymer has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the ethylene/alpha-olefin interpolymer is an ethylene/α-olefin copolymer. Preferred α-olefins are described above.

In one embodiment, the ethylene/alpha-olefin interpolymer has a molecular weight distribution (Mw/Mn) less than, or equal to, 3.5, further less than, or equal to, 3.0, further less than, or equal to, 2.5, and further less than, or equal to, 2.3. In a further embodiment, the ethylene/alpha-olefin interpolymer is an ethylene/α-olefin copolymer. Preferred α-olefins are described above.

In one embodiment, the ethylene/alpha-olefin interpolymer has a molecular weight distribution (Mw/Mn) greater than, or equal to, 1.3, further greater than, or equal to, 1.5, further greater than, or equal to, 1.7, and further greater than, or equal to, 1.9. In a further embodiment, the ethylene/alpha-olefin interpolymer is an ethylene/α-olefin copolymer. Preferred α-olefins are described above.

In one embodiment, the ethylene/alpha-olefin interpolymer has a weight average molecular weight (Mw) less than, or equal to, 40,000 g/mole, further less than, or equal to, 30,000 g/mole, further less than, or equal to, 25,000 g/mole. In a further embodiment, the ethylene/alpha-olefin interpolymer is an ethylene/α-olefin copolymer. Preferred α-olefins are described above.

In one embodiment, the ethylene/alpha-olefin interpolymer has a weight average molecular weight (Mw) greater than, or equal to, 5000 g/mole, further greater than, or equal to, 7000 g/mole, further greater than, or equal to, 10000 g/mole. In a further embodiment, the ethylene/alpha-olefin interpolymer is an ethylene/α-olefin copolymer. Preferred α-olefins are described above.

In one embodiment, the ethylene/alpha-olefin interpolymer has a melt index (I2 or MI), or calculated melt index (I2 or MI), greater than, or equal to, 400 g/10 min, further greater than, or equal to, 600 g/10 min, and more further greater than, or equal to, 800 g/10 min. In a further embodiment, the ethylene/alpha-olefin interpolymer is an ethylene/α-olefin copolymer. Preferred α-olefins are described above.

In one embodiment, the ethylene/alpha-olefin interpolymer has a melt index (I2 or MI), or calculated melt index (I2 or MI), less than, or equal to, 2000 g/10 min, further less than, or equal to, 1500 g/10 min, and further less than, or equal to, 1200 g/10 min. In a further embodiment, the ethylene/alpha-olefin interpolymer is an ethylene/α-olefin copolymer. Preferred α-olefins are described above.

In one embodiment, the ethylene/alpha-olefin interpolymer has a percent crystallinity less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the ethylene/alpha-olefin interpolymer is an ethylene/α-olefin copolymer. Preferred α-olefins are described above.

In one embodiment, the ethylene/alpha-olefin interpolymer has a percent crystallinity greater than, or equal to, 2 percent, further greater than, or equal to, 5 percent, and further greater than, or equal to, 10 percent, as determined by DSC. In a further embodiment, the ethylene/alpha-olefin interpolymer is an ethylene/α-olefin copolymer. Preferred α-olefins are described above.

In one embodiment, the ethylene/alpha-olefin interpolymer has a density greater than, or equal to, 0.855 g/cc, further greater than, or equal to, 0.860 g/cc, and further greater than, or equal to, 0.865 g/cc. In a further embodiment, the ethylene/alpha-olefin interpolymer is an ethylene/α-olefin copolymer. Preferred α-olefins are described above.

In one embodiment, the ethylene/alpha-olefin interpolymer has a density less than, or equal to, 0.900 g/cc, further less than, or equal to, 0.895 g/cc, and further less than, or equal to, 0.890 g/cc. In a further embodiment, the ethylene/alpha-olefin interpolymer is an ethylene/α-olefin copolymer. Preferred α-olefins are described above.

In one embodiment, the ethylene/alpha-olefin interpolymer has a density less than, or equal to, 0.887 g/cc, further less than, or equal to, 0.885 g/cc, and further less than, or equal to, 0.880 g/cc. In a further embodiment, the ethylene/alpha-olefin interpolymer is an ethylene/α-olefin copolymer. Preferred α-olefins are described above.

The ethylene/alpha-olefin interpolymer may comprise a combination of two or more embodiments as described herein.

The ethylene/alpha-olefin copolymer may comprise a combination of two or more embodiments as described herein.

An inventive composition may comprise a combination of two or more embodiments described herein.

The invention also provides an article comprising at least one component formed from an inventive composition.

In a further embodiment, the article further comprises a substrate. In a further embodiment, the substrate is selected from the group consisting of the following: coated substrates, substrates made from recycled paper, and combinations thereof.

An inventive article may comprise a combination of two or more embodiments as described herein.

The following embodiments, apply to the inventive processes as described above.

In one embodiment, the efficiency of the catalyst is greater than, or equal to, 3,200,000 lb polymer per lb catalyst metal, further greater than, or equal to, 3,500,000 lb polymer per lb catalyst metal, further greater than, or equal to, 3,800,000 lb polymer per lb catalyst metal.

In one embodiment, for an inventive process, the reactor has a reactor loop recycle ratio (RR) greater than 15.0, further greater than 18.0, further greater than 20.0.

The loop reactor recycle ratio (vol/vol)=loop flow rate/reactor outlet flow rate; wherein the loop flow rate is the total reactor loop recirculation volumetric flow rate in m$^3$/hr; and the reactor outlet flow rate is the volumetric flow rate of the reactor outlet stream in m$^3$/hr.

For example, if the loop flow rate is 500 m$^3$/hr; and the reactor outlet flow rate is 25 m$^3$/hr, then the loop reactor recycle ratio is 20.0.

In one embodiment, the residence time of the interpolymer in the reactor is greater than, or equal to 20 minutes, further greater than, or equal to 22 minutes, further greater than, or equal to 24 minutes.

In one embodiment, the reactor alpha-olefin concentration is greater than, or equal to 60.0 kg/m$^3$, further greater than, or equal to, 65 kg/m$^3$. Preferred α-olefins include, but are not limited to, C3-C20 α-olefins, and further C3-C10 α-olefins. More preferred α-olefins include propylene, 1-butene, 1-pentene, 1-hexene, 1-heptene and 1-octene, and more further include propylene, 1-butene, 1-hexene and 1-octene.

In one embodiment, for an inventive process, the reactor is selected from the following: a recirculated loop reactor, a continuous stirred-tank reactor, a plug-flow reactor, or a combination thereof.

In one embodiment, for an inventive process, the catalyst is selected from a constrained geometry catalysts, a metallocene catalysts, or a metal (e.g., hafnium, zirconium, or titanium) complex of a polyvalent aryloxyether.

In one embodiment, for an inventive process, the polymerization takes place at a temperature from 100° C. to 150° C.

In one embodiment, for an inventive process, the polymerization takes place at a pressure from 40 bar to 60 bar.

In one embodiment, for an inventive process, the ethylene concentration in the reactor is greater than, or equal to, 16 kg/m$^3$, further greater than, or equal to, 18 kg/m$^3$.

In one embodiment, for an inventive process, the ethylene concentration in the reactor is from 14.0 kg/m$^3$ to 20.0 kg/m$^3$.

In one embodiment, for an inventive process, the reactor comprises at least one mixing system selected from the following: a) a high speed agitation mixer, b) a recirculation pumping system, c) an in-line mixing element, or d) a combination thereof.

An inventive process may comprise a combination of two or more embodiments described herein.

Ethylene/α-Olefin Interpolymers

In one embodiment, the ethylene/α-olefin interpolymer is a homogeneously branched linear interpolymer, and further a copolymer, or a homogeneous branched substantially linear interpolymer, and further a copolymer.

In one embodiment, the ethylene/α-olefin interpolymer is a homogeneously branched linear interpolymer, and further a copolymer.

In one embodiment, the ethylene/α-olefin interpolymer is a homogeneous branched substantially linear interpolymer, and further a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 total carbons" to "3 long chain branches per 1000 total carbons." The length of a long chain branch is longer than the carbon length of a short chain branch, formed from the incorporation of one comonomer into the polymer backbone.

Some polymers may be substituted with "0.01 long chain branches per 1000 total carbons to 3 long chain branch per 1000 total carbons," further from "0.01 long chain branches per 1000 total carbons to 2 long chain branch per 1000 total carbons," and further from "0.01 long chain branches per 1000 total carbons to 1 long chain branch per 1000 total carbons."

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers, and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The ethylene/α-olefin interpolymer may comprise a combination of two or more embodiments as described herein.

The ethylene/α-olefin copolymer may comprise a combination of two or more embodiments as described herein.

Additives and Applications

Typically polymers and resins used in the invention are treated with one or more stabilizers, for example, antioxidants, such as IRGANOX 1010, IRGANOX 1076, and IRGAFOS 168, now supplied by BASF. Polymers are typically treated with one or more stabilizers before an extrusion or other melt processes. Other polymeric additives include, but are not limited to, ultraviolet light absorbers, antistatic agents, pigments and dyes, nucleating agents, fillers, slip agents, fire retardants, plasticizers, processing aids, lubricants, stabilizers, smoke inhibitors, viscosity control agents and anti-blocking agents. The inventive compositions may also contain one or more thermoplastic polymers.

The inventive compositions may also be used in a variety of application, including, but not limited to, adhesives, automotive applications, graphic arts, nonwovens, panel assembly, high performance tapes, contact hot melt adhesives, paperboard coatings, inks, personal care and cosmetic products, sealants, color and additive concentrates, carpet-tape adhesives, woodworking adhesives, and profile wrap adhesives.

The inventive compositions may further comprise a tackifier. Exemplary tackifying resins include, but are not limited to, aliphatic, cycloaliphatic and aromatic hydrocarbons, and modified hydrocarbons and hydrogenated versions; terpenes and modified terpenes and hydrogenated versions; and rosins and rosin derivatives and hydrogenated versions; and mixtures thereof. Suitable tackifiers include, but are not limited to, EASTOTAC H100 and EASTOTAC H115, each available from Eastman Chemical.

In one embodiment, the composition comprises from 10 to 60 weight percent, further from 10 to 50 weight percent, and further from 10 to 40 weight percent of the tackifier, based on the weight of the composition. In a further embodiment, the tackifier is a hydrocarbon, and further a hydrogenated hydrocarbon.

The inventive compositions may further comprise a wax. Waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410; 6,054,544 and 6,723,810; which are all incorporated herein by reference. Preferred waxes include, but are not limited to, SASOL waxes (e.g., SASOLWAX H1 from Sasol Wax Company), and Fischer-Tropsch waxes.

In one embodiment, the composition comprises from 10 to 60 weight percent, further from 10 to 50 weight percent, and further from 10 to 40 weight percent, and further from 10 to 30 weight percent of the wax, based on the weight of the composition.

The inventive compositions may further comprise an oil. Oils are typically employed to reduce the viscosity of the adhesive. When employed, an oil will be typically present in an amount less than 50, preferably less than 40, and more preferably less than 35 weight percent, based on the weight of the composition. An oil may present in an amount greater than, or equal to, 1 weight percent, further greater than, or equal to, 2 weight percent, and further greater than, or equal to, 5 weight percent, based on the weight of the composition. Exemplary classes of oils include, but are not limited to, white mineral oil (such as KAYDOL oil available from Witco), and SHELLFLEX 371 naphthenic oil (available from Shell Oil Company) and CALSOL 5550 (naphthenic oil from Calumet Lubricants).

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "propylene-based polymer," as used herein, refers to a polymer that comprises, in polymerized form, a majority amount of propylene monomer (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Viscosity

Melt viscosity was measured in accordance with ASTM D 3236 (350° F.), using a Brookfield Digital Viscometer (Model DV-III, version 3), and disposable aluminum sample chambers. The spindle used, in general, was a SC-31 hot-melt spindle, suitable for measuring viscosities in the range from 10 to 100,000 centipoise. The sample was poured into the chamber, which was, in turn, inserted into a Brookfield Thermosel, and locked into place. The sample chamber had a notch on the bottom that fit the bottom of the Brookfield Thermosel, to ensure that the chamber was not allowed to turn, when the spindle was inserted and spinning. The sample (approximately 8-10 grams of resin) was heated to the required temperature, until the melted sample was about one inch below the top of the sample chamber. The viscometer apparatus was lowered, and the spindle submerged into the sample chamber. Lowering was continued, until the brackets on the viscometer aligned on the Thermosel. The viscometer was turned on, and set to operate at a shear rate, which led to a torque reading in the range of 40 to 60 percent of the total torque capacity, based on the rpm output of the viscometer. Readings were taken every minute for about 15 minutes, or until the values stabilized, at which point, a final reading was recorded.

Melt Index

Melt index (I2, or MI) of an ethylene-based polymer was measured in accordance with ASTM D-1238, condition 190° C./2.16 kg. For high I2 polymers (I2 greater than, or equal to, 200 g/mole, melt index was preferably calculated from Brookfield viscosity, as described in U.S. Pat. Nos. 6,335, 410; 6,054,544; 6,723,810. $I2(190° C./2.16 kg) = 3.6126[10^{(log(\eta)-6.6928)/-1.1363}]-9.31851$, where η=melt viscosity, in cP, at 350° F.

Differential Scanning Calorimetry (DSC)

Differential Scanning Calorimetry (DSC) was used to measure the heat of fusion, melting temperature and crystallinity in ethylene (PE)-based samples and propylene (PP)-based samples. About five to eight milligrams of sample was weighed and placed in a DSC pan. The lid was crimped on the pan to ensure a closed atmosphere. The sample pan was placed in a DSC cell, and then heated from room temperature, at a rate of approximately 50° C./min, to a temperature of 180° C. for PE (230° C. for PP). The sample was kept at this temperature for five minutes, at the end of the first heat scan. Then the sample was cooled at a rate of 10° C./min to −60° C. for PE (−40° C. for PP), and kept isothermally at that temperature for three minutes. The sample was next heated at a rate of 10° C./min to 180° C. for PE (230° C. for PP), until complete melting (second heat). The percent crystallinity was calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/ 292 J/g)×100; and for PP, % cryst.=($H_f$/165 J/g)×100).

Figure 4:
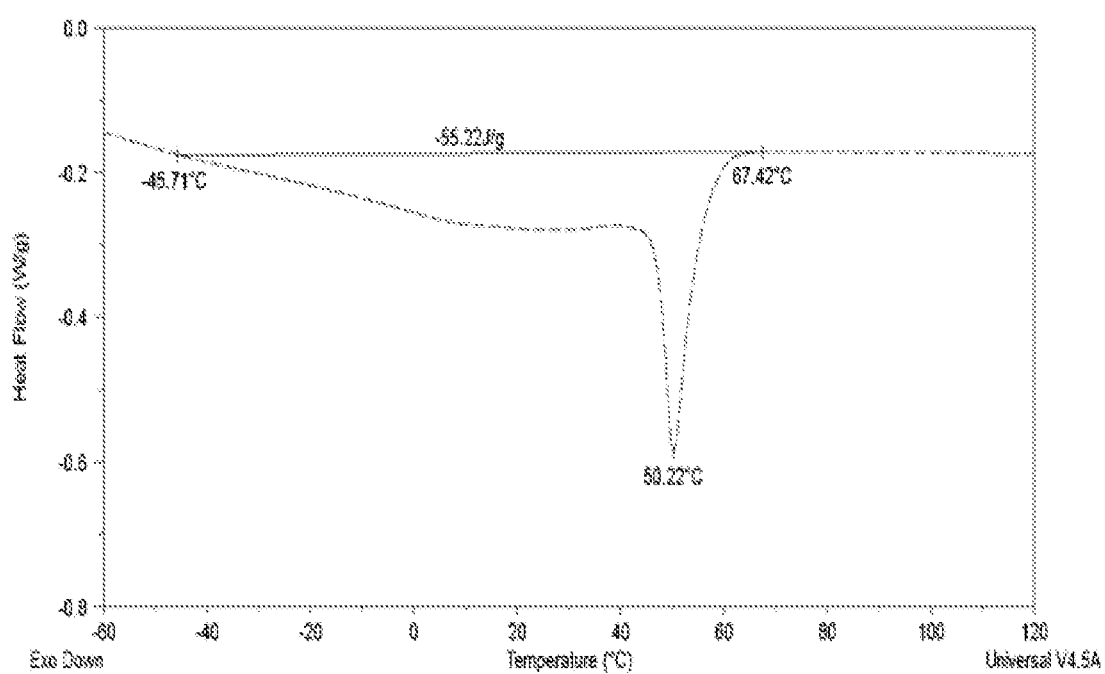
FIG. 4 is a DSC cooling profile of Polymer 1.
Figure 5:
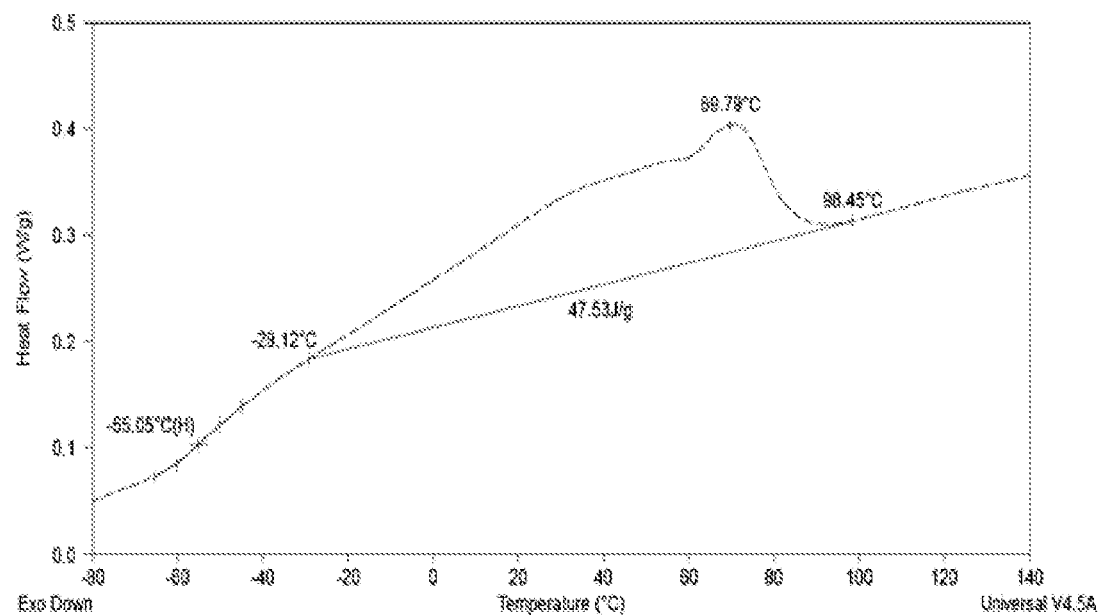
FIG. 5 is a DSC heating profile of Polymer 1.

Unless otherwise stated, melting point(s) (Tm) of each polymer was determined from the second heat curve obtained from DSC, as described above. The crystallization temperature ($T_c$) was measured from the first cooling curve. FIG. 4 shows the DSC cooling profile of Polymer 1. FIG. 5 shows the DSC heating profile of Polymer 1.

Density

Density was measured in accordance with ASTM D-792. The density measured was a "quick density," meaning that the density was determined after one hour from the time of molding.

High Comonomer Content (HCC) Method

A commercial Crystallization Elution Fractionation instrument (CEF) (Polymer Char, Spain) was used to perform the high temperature thermal gradient interaction chromatography (TGIC) measurement (Cong, et al., Macromolecules, 2011, 44 (8), 3062-3072). A HYPERCARB column (100×4.6 mm, Part #35005-104646, Thermo Scientific) was use for separation. A "8 cm×0.48 cm (3/16 inch ID)" stainless steel column, packed with 27 micron glass bead (Catalog #GL01918/20-27 um, MO-SCI Specialty Products, LLC, Rolla, Mo., USA), was installed in front of IR detector, in the top oven of the CEF instrument. The experimental parameters were as follows: a top oven/transfer line/needle temperature at 150° C., a dissolution temperature at 160° C., a dissolution stirring setting at 2, a sample loading volume of 0.400 mL, a pump stabilization time of 15 seconds, a pump flow rate of cleaning column at 0.500 mL/m, a pump flow rate of column loading at 0.300 ml/min, a stabilization temperature at 150° C., a stabilization time (pre, prior to load to column) at 3.0 min, a stabilization time (post, after loaded to column) at 1.0 min, a SF (Soluble Fraction) time at 3.0 min, a cooling rate of 3.00° C./min from 150° C. to 30° C., a flow rate during cooling process of 0.00 ml/min, a heating rate of 2.00° C./min from 30° C. to 160° C., an isothermal time at 160° C. for 10 min, an elution flow rate of 0.500 mL/min, and an injection loop size of 140 microliters.

Samples were prepared by the PolymeiChar autosampler at 160° C., for 60 minutes, at a concentration of 4.0 mg/ml in ODCB (defined below). Silica gel 40 (particle size 0.2-0.5 mm, catalogue number 10181-3, EMD) was dried in a vacuum oven at 160° C., for about two hours, prior to use. 2,5-Di-ter-butyl-4-methylphenol (1.6 grams, BHT, catalogue number B 1378-500G, Sigma-Aldrich) and silica gel (5.0 grams) were added to two liters of ortho-dichlorobenze (ODCB, 99% anhydrous grade, Sigma-Aldrich). This "ODCB containing BHT and silica gel" is now referred to as "ODCB." This ODCB was sparged with dried nitrogen ($N_2$) for one hour prior to use.

The TGIC data was processed on a PolymerChar (Spain) "GPC One" software platform. The temperature calibration was performed with a mixture of about 4 to 6 mg Eicosane, 14.0 mg of isotactic homopolymer polypropylene iPP (molecular weight Mw reported as polyethylene equivalent of 150,000 to 190,000 g/mole, and polydispersity (Mw/Mn) of 3.6 to 4.0), and 14.0 mg of homopolymer polyethylene HDPE (zero comonomer content, Mw reported as polyethylene equivalent as 115,000 to 125,000 g/mole, and polydispersity of 2.5 to 2.8), in a 10 mL vial filled with 7.0 mL of ODCB. The dissolution time was two hours at 160° C.

The calibration process (30° C. to 150° C. for Eicosane elution and HDPE elution) consisted of the following steps:

Extrapolated the eluting temperature for each of the isothermal steps during elution according to heating rate (demonstrated in FIG. 1).

Calculated the delay volume. Shifted the temperature (x-axis) corresponding to the IR measurement channel chromatogram (y-axis), so that the EICOSANE peak (y-axis) was coincident with elution temperature at 30.0° C. The delay volume was calculated from the temperature difference (30° C.—the actual elution temperature of Eicosane peak) divided by heating rate of the method, and then multiplied by elution flow rate.

Adjusted each recorded elution temperature with this same delay volume adjustment.

Linearly scaled the heating rate, so that the HDPE reference had an elution peak temperature of 150.0° C., while maintaining an Eicosane elution peak temperature of 30.0° C.

The peak temperature of the polypropylene was observed to be 119.3-120.2° C., which is a validation of the calibration method.

Data processing for polymer samples of TGIC is described below.

A solvent blank (pure solvent injection) was run at the same experimental conditions as the polymer samples. Data processing for polymer samples included the following: a) subtraction of the solvent blank for each detector channel, b) temperature extrapolation, as described in the calibration process, c) compensation of temperature with the delay volume, determined from the calibration process, and d) adjustment in elution temperature axis to the 30° C. and 160° C. range, as calculated from the heating rate of the calibration.

The chromatogram was integrated with PolymerChar "GPC One" software. A straight baseline was drawn from the visible difference, when the peak falls to a flat baseline (roughly a zero value in the blank subtracted chromatogram), at high elution temperature, and the minimum or flat region of detector signal on the high temperature side of the soluble fraction (SF).

Figure 6:
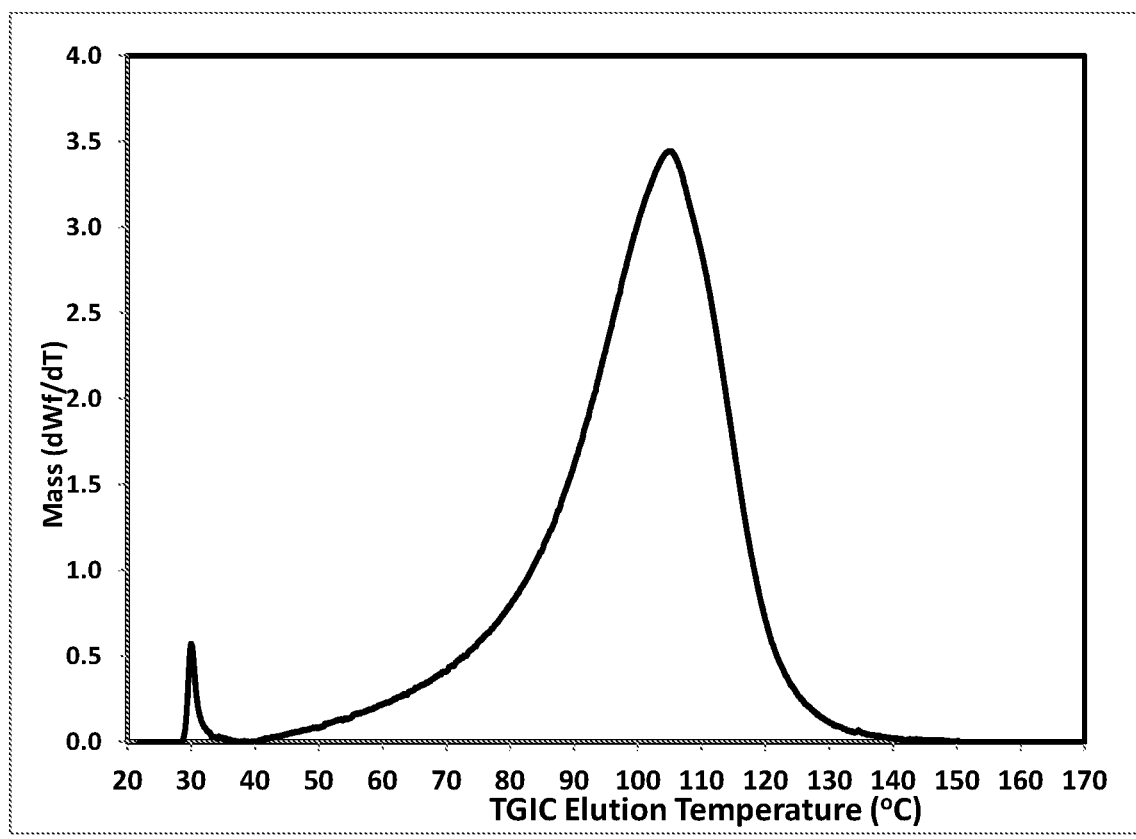
FIG. 6 is an example chromatogram for the determination of the HCC value.

The upper temperature integration limit was established, based on the visible difference, when the peak falls to the flat baseline region (roughly a zero value in the blank subtracted chromatogram). The lower temperature integration limit was established, based on the intersection point of baseline with the chromatogram, including the soluble fraction. The "High Comonomer Content (HCC)" is defined as the weight percentage of the material eluting at a temperature ≤65.0° C. The HCC was calculated by integrating the IR measurement channel, at temperatures less than, and including, 65.0° C., and dividing this value by the total integration of the IR measurement channel. An example chromatogram is shown in FIG. 6.

Conventional GPC

The high temperature gel permeation chromatography (HT GPC) systems consisted of either a PL-220 model from Agilent, or a GPC IR model from PolymerChar. The column and carousel compartments were operated at 140° C. Three Polymer Laboratories "10-μm Mixed-B columns" were used with a solvent of 1,2,4-trichlorobenzene. The samples were prepared at a concentration of "0.1 g of polymer in 50 mL of solvent." The solvent used to prepare the samples contains "200 ppm of the antioxidant BHT." Samples were prepared by agitating/shaking lightly for four hours at 160° C. The injection volume was 200 microliters, and the flow rate was 1.0 mL/min. Calibration of the GPC column set was performed with twenty one, narrow molecular weight distribution polystyrene standards, purchased from Agilent. The polystyrene standard peak molecular weights were converted to polyethylene molecular weights using Equation 1 below:

$$Mpolyethylene = A(Mpolystyrene)^B \quad \text{(Eq. 1)},$$

where M is the molecular weight, A has a value of 0.4316, and B is equal to 1.0 (Reference: T. Williams and I. M. Ward, J. Polym. Sci., Polym. Let, 6, 621 (1968)). A third order polynomial was determined to build the logarithmic molecular weight calibration as a function of elution volume. Polyethylene equivalent molecular weight calculations were performed using "GPC One" software (PolymeiChar). Number average and weight average molecular weights were calculated according to the following Equation 2 and Equation 3:

$$M_n = \frac{\sum\limits_i Wf_i}{\sum\limits_i Wf_i / M_i}, \quad \text{(Eq. 2)}$$

$$M_w = \frac{\sum\limits_i Wf_i * M_i}{\sum\limits_i Wf_i}. \quad \text{(Eq. 3)}$$

In Equations 2 and 3, the $Wf_i$ is the weight fraction of the i-th component, and the Mi is the molecular weight of the i-th component. The precision of the weight-average molecular weight Mw is <2.6%. Replicate analysis can be made in order to achieve this precision.

Pellet Flowability Test Method

To quantify pellet-to-pellet stickiness, a funnel test was developed. This test is based on the basic concept that increased interparticle interaction (stickiness) will reduce discharge rate out of a steep funnel. The change in discharge rate can be related to change in surface properties (i.e., stickiness) of a polymer pellet.

Figure 2:
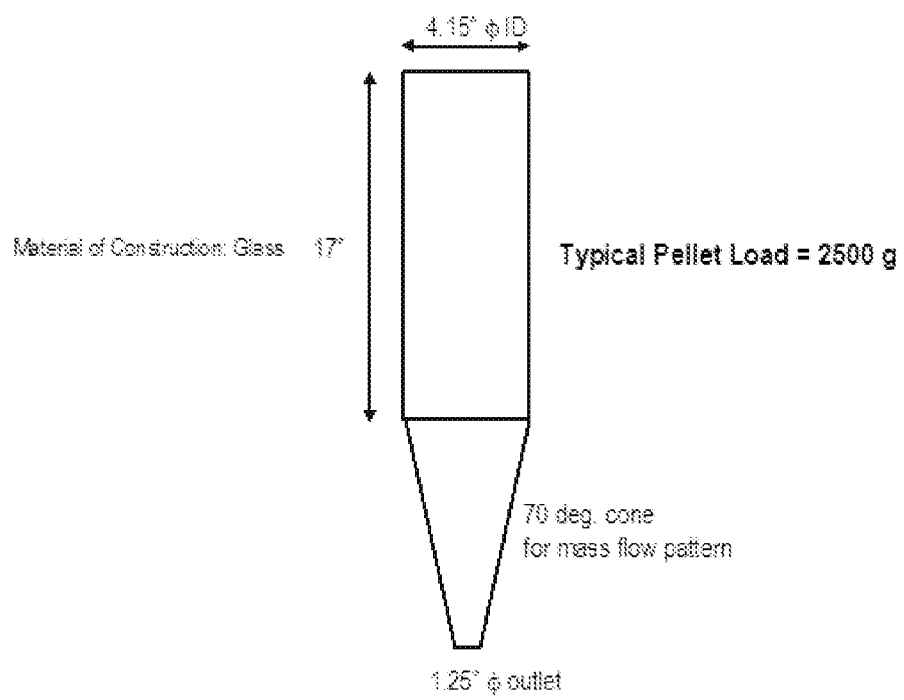
FIG. 2 depicts the test funnel for the pellet flowability study.

The test apparatus (see FIG. 2) consists of a steep glass funnel attached to a cylinder (4.15 inch diameter). The cylindrical section provides necessary capacity, so that substantial amount of pellets can be tested, and to avoid the problem of differentiating small values of discharge times. The test was repeated five times for statistical purpose.

The discharge rate of pellets was measured on "as received" sample, and after conditioning pellets at a pre-defined storage temperature, for pre-determined duration. Pellets were "thermally treated" or "aged" at 42° C. for three weeks. The conditioned pellets were cooled overnight, at 21° C., to achieve constant temperature.

As discussed above, polymer (about 2500 g; pellet form; 30±10 pellets per gram) was thermally treated in an oven, at 42° C. for three weeks. The polymer was removed from the oven, and allowed to cool for 12 hours at 21° C. The funnel was charged with the polymer pellets (2500 g), and the time for the complete discharge of the pellets from the funnel was measured, and the discharge rate was calculated using the equation below.

Discharge Rate or Flowability (g/s)=Amount of Pellets In Funnel (g)/Time Taken To Discharge (s)

Figure 3:
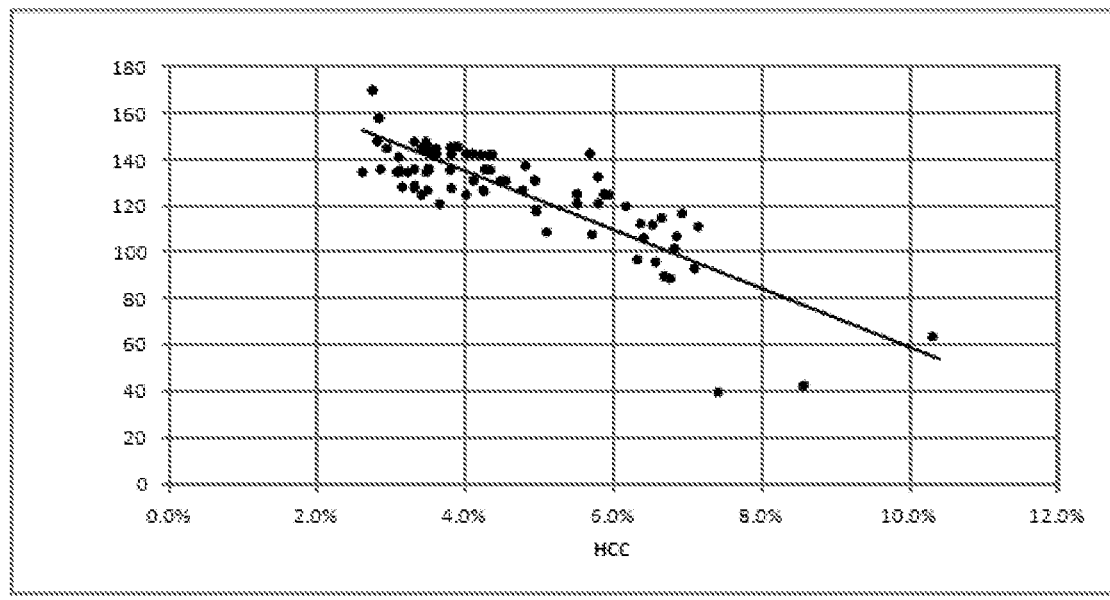
FIG. 3 depicts the correlation of pellet flowability with HCC (%) level. Flowability (g/s)=−12.6×HCC (%)+186. Pellets were thermally treated at 42° C. for three weeks.

The flowability is an indicator of pellet stickiness. It has been determined that flowability of 120 g/s is the minimum flow rate needed to achieve acceptable handling characteristics of the polymer pellets. However, even higher rates are preferred for better handling of the polymer pellets. Higher pellet flowability values correspond to more free-flowing and less sticky pellets. FIG. 3 depicts the correlation of pellet flowability with HCC (%) level (Flowability (g/s)=−12.6× HCC (%)+186).

Yellowness Index (YI)

Yellowness Index (YI) values were determined on pellets using ASTM D6290-05 (Method Title: Standard Test Method for Color Determinations of Plastic Pellets). The yellowness index (YI) is an instrumental measurement, using a BYK-Gardner Model 9000 spectrophotometer with sample rotator of the degree of yellowness (or change of degree of yellowness) under daylight illumination of homogeneous, nonfluorescent, nearly-colorless transparent or nearly-white translucent or opaque plastics. The measurement was made on pellets (250 g), and based on values obtained with a colorimeter. The test method is applicable to the color analysis of plastic pellets. Color in the polymer was primarily due to organic impurities. Inorganic impurities may also affect the color.

Elemental Content of Polyolefins

The elemental content of the polymer samples were determined by following ASTM D6247-10, "Standard Test Method for Determination of Elemental Content of Polyolefins by Wavelength Dispersive X-Ray Fluorescence Spectroscopy." This test method describes the general procedure for the determination of elemental content in polyolefins. Typical elements include those contributed by additives, catalysts and reactor processes. A PANalytical Axios X-ray spectrometer was used for this study, and the manufacturer's recommended guidelines were used for calibration, using SuperQ software. Calibration standards were prepared, each containing a homogeneous dispersion of a known amount of inorganic additive in a polyolefin homopolymer. The standards were characterized using independent analytical techniques, such as, inductively coupled plasma atomic emission spectrometry, XRF fundamental parameters analysis, neutron activation analysis, and known mass additions. Pellet samples and calibration standards were compression molded into plaques as discussed below. After the XRF instrument was calibrated, unknowns were measured and elemental concentrations calculated.

A polymer sample (10 g) was used to form a plaque, using a commercial Buehler SimpliMet 3000 automatic mounting press. SimpliMet 3000 is a programmable hot press, capable of molding one or two samples in the same procedure. The molding conditions were as follows: heat time of two minutes, cool time of three minutes, pressure at 1200 psi, temperature of around 180° F., preload pressure at 200 psi, mold size two inches in diameter.

Experimental

A. Representative Polymerization—Overview

Each polymer was prepared in a continuous solution polymerization. All reagents (monomer, comonomer, hydrogen, solvent) were dissolved into a solvent carrier feed stream and injected into a recirculated, single loop reactor. The solvent was ISOPAR E.

The catalyst was (titanium, [N-(1,1-dimethylethyl)-1,1-dimethyl-1-[(1,2,3,4,5-η)-2,3,4,5-tetramethyl-2,4-cyclopentadien-1-yl]silanaminato(2-)-κN][(1,2,3,4-η)-1,3-pentadiene]-). Two co-catalysts were used: tris(2,3,4,5,6,-pentafluorophenyl)borane and modified methylaluminoxane. The two co-catalysts are mixed prior to injection, and this mixture is fed to the reactor separately from the catalyst.

The alpha-olefin comonomer (1-octene) concentration in the feed and in the reactor was used to controlled the density of the polymer, and the hydrogen concentration was used to controlled the melt viscosity (or molecular weight) of the polymer. Each polymerization was run a temperature from 110 to 140° C., and at a reaction pressure from 40 to 50 barg. The reactor product stream was passed thought additional unit operations, in order to remove the unreacted reagents and solvent. The polymer melt was then extruded into pellets. The polymer was stabilized with ppm amounts of IRGANOX 1010.

It has been discovered certain reactor conditions affect the "High Comonomer Content (HCC)" value of the polymer. The key reactor conditions or parameters used to control the HCC of the polymer are as follows: i) the reactor temperature, ii) the ethylene concentration, iii) the comonomer concentration, iv) the polymer concentration, v) the reactor mixing Reynolds Number, vi) the reactor residence time, and vii) the reactor loop recycle ratio. Also, it has been discovered that a key parameter for monitoring the amount of inorganic or metal impurities is the reactor catalyst efficiency.

General reactor parameters needed to reduce the HCC value of the polymer are as follows:
  i. high reactor ethylene concentration,
  ii. low comonomer concentration,
  iii. high reactor mixing Reynolds Number,
  iv. high reactor residence time, and
  v. high reactor loop recycle ratio.

A summary of the polymerization conditions are shown below in Table 1. Polymer properties are listed in Table 2 below.

As seen in Table 2, the Polymer 1 had a low HCC value and a high pellet flowability. The overall lower inorganic content of Polymer I will help to reduce die build-up in the extrusion of this polymer, and reduce haze in films or coatings formed from compositions comprising this polymer. Also, the lower Tm of Polymer I will allow a lower temperature application of this polymer, for example, in an adhesive formulation.

TABLE 1

Polymerization Conditions

| Reactor Property | Polymer 1 | Polymer 2 | Polymer 3 | Polymer 4 | Polymer 5 |
| --- | --- | --- | --- | --- | --- |
| Temperature (deg C.) | 125 | 120 | 140 | 130 | 140 |
| Pressure (Barg) | 50 | 50 | 50 | 50 | 50 |
| Ethylene Concentration (kg/m3) | 14.0 | 14.0 | 8.0 | 14.0 | 8.0 |
| Polymer Concentration (wt %) | 38 | 35 | 45 | 45 | 45 |
| 1-Octene Concentration (kg/m3) | 71.1 | 63.5 | 52.1 | 70.0 | 57.3 |
| Reynolds Number | 8330 | 7484 | 5020 | 2310 | 4407 |
| Residence Time (min) | 25 | 25 | 12 | 25 | 12 |
| Recycle Ratio | 24 | 24 | 17 | 24 | 17 |
| Catalyst Efficiency (lb polymer/lb catalyst metal) | 4,000,000 | 800,000 | 2,000,000 | 600,000 | 1,000,000 |

TABLE 2

Polymer Properties (each ppm amount based on weight of polymer)

| Polymer Property | Polymer 1 | Polymer 2 | Polymer 3 | Polymer 4 | Polymer 5 |
| --- | --- | --- | --- | --- | --- |
| Density (kg/m$^3$) | 870.2 | 870.9 | 871.8 | 874.4 | 867.7 |
| Melt Viscosity (cP) | 8518 | 7828 | 8428 | 18656 | 7138 |
| Tm (deg C.)* | 69.8 | 71.4 | — | 74.9 | 70.6 |
| Yellowness Index | 1.00 | 0.19 | −0.79 | −1.42 | −1.59 |
| Pellet Count (pellets/g) | 28 | 32 | 32 | 34 | 30 |
| Pellet Flowability (g/s) | 174.4 | 156.4 | 120.9 | 154.5*** | 86.3 |
| HCC (%) | 3.9 | 4.7 | 8.5 | 2.5 | 7.1 |
| Inorganic content of: "Al, Ca, Cl, Mg, Na, S, P, Zn, Ti, Zr, and Hf" (ppm)** | 58.2 | 565.2 | 398.0 | NA | NA |
| Inorganic content of: "Al, Ca, Cl, Mg, Na, S, P, Zn, Ti, and Zr" (ppm)** | 57.2 | 564.2 | 397.0 | NA | NA |
| Inorganic content of: "Al, Na, and Mg" (ppm)** | 31.4 | 476.4 | 331.8 | NA | NA |

TABLE 2-continued

Polymer Properties (each ppm amount based on weight of polymer)

| | Polymer Property | | | | |
|---|---|---|---|---|---|
| | Polymer 1 | Polymer 2 | Polymer 3 | Polymer 4 | Polymer 5 |
| Inorganic content of "Ca" (ppm)** | 5.0 | 5.2 | 5.0 | NA | NA |

*Tm is the "highest peak melting temperature" defined as the as the temperature at which the highest heat flow is observed. For example, see FIG. 5.
**An inorganic/metal that was below the detection level (less than 5 ppm) for each of Al, Ca, Cl, Mg, S, P, and Zn was assumed to be 5.0 ppm. An inorganic/metal that was below the detection level (less than 0.5 ppm) for each of Ti, Zr and Hf, was assumed to be 0.5 ppm. An inorganic/metal that was below the detection level (less than 20.0 ppm) for Na, was assumed to be 20.0 ppm.
***Pellet Flowability determined from the following equation: Flowability (g/s) = −12.6 × HCC(%) + 186.
NA = Not Available.

The invention claimed is:

1. A composition comprising an ethylene/alpha-olefin interpolymer, and wherein the ethylene/alpha-olefin interpolymer comprises the following properties:
    a) a high comonomer content (HCC) value less than, or equal to, 6.0%; and
    b) an inorganic content of "Al, Na and Mg" less than, or equal to, 40.0 ppm, and a Ca content less than 7.0 ppm, each based on the weight of the ethylene/alpha-olefin interpolymer, and
    wherein the ethylene/alpha-olefin interpolymer has a weight average molecular weight (Mw) greater than, or equal to, 5000 g/mole.

2. The composition of claim 1, wherein the ethylene/alpha-olefin interpolymer has an inorganic content of Cr, Mo, Ni and Pd less than, or equal to, 10.0 ppm, based on the weight of the interpolymer.

3. The composition of claim 1, wherein the ethylene/alpha-olefin interpolymer has a density less than, or equal to, 0.890 g/cc.

4. The composition of claim 1, wherein the ethylene/alpha-olefin interpolymer has a Yellowness Index (YI) less than, or equal to, 2.00.

5. The composition of claim 1, wherein the ethylene/alpha-olefin interpolymer has a pellet flowability greater than, or equal to, 125.0 g/sec.

6. The composition of claim 1, wherein the ethylene/alpha-olefin interpolymer has a melt viscosity from 2,000 cP to 50,000 cP at 350° F. (177° C.).

7. The composition of claim 1, wherein the alpha-olefin is a C3-C20 alpha-olefin.

8. An article comprising at least one component formed from the composition of claim 1.

9. The composition of claim 1, wherein the ethylene/alpha-olefin interpolymer has a molecular weight distribution (Mw/Mn) greater than, or equal to, 1.3.

10. A composition comprising an ethylene/alpha-olefin interpolymer, and wherein the ethylene/alpha-olefin interpolymer comprises the following properties:
    a) a high comonomer content (HCC) value less than, or equal to, 6.0%; and
    b) an inorganic content of "Al, Ca, Cl, Mg, Na, S, P, Ti, and Zn" less than, or equal to, 65.0 ppm, based on the weight of the ethylene/alpha-olefin interpolymer, and
    wherein the ethylene/alpha-olefin interpolymer has a weight average molecular weight (Mw) greater than, or equal to, 5000 g/mole.

11. The composition of claim 10, wherein the ethylene/alpha-olefin interpolymer has a molecular weight distribution (Mw/Mn) greater than, or equal to, 1.3.

12. A composition comprising an ethylene/alpha-olefin interpolymer, and wherein the ethylene/alpha-olefin interpolymer comprises the following properties:
    a) a high comonomer content (HCC) value less than, or equal to, 6.0%; and
    b) an inorganic content of "Al, Ca, Cl, Mg, Na, S, P, Ti, Zn, Zr, and Hf" less than, or equal to, 65.0 ppm, based on the weight of the ethylene/alpha-olefin interpolymer, and
    wherein the ethylene/alpha-olefin interpolymer has a weight average molecular weight (Mw) greater than, or equal to, 5000 g/mole.

13. The composition of claim 12, wherein the ethylene/alpha-olefin interpolymer has a molecular weight distribution (Mw/Mn) greater than, or equal to, 1.3.

* * * * *